(12) United States Patent
Bosak et al.

(10) Patent No.: US 11,492,969 B2
(45) Date of Patent: Nov. 8, 2022

(54) ENGINE THERMAL MANAGEMENT METHODS AND CONTROL SYSTEMS

(71) Applicant: MEGGITT AEROSPACE LIMITED, Christchurch (GB)

(72) Inventors: David Bosak, Christchurch (GB); Philip Walsh, Solihull (GB); Steve Parker, Christchurch (GB)

(73) Assignee: MEGGITT AEROSPACE LIMITED, Christchurch (GB)

( * ) Notice: Subject to any disclaimer, the term of this patent is extended or adjusted under 35 U.S.C. 154(b) by 92 days.

(21) Appl. No.: 16/708,328

(22) Filed: Dec. 9, 2019

(65) Prior Publication Data
US 2021/0172375 A1 Jun. 10, 2021

(51) Int. Cl.
  *F02C 7/14* (2006.01)
  *B64D 33/08* (2006.01)
  *F02C 7/06* (2006.01)
  *F04B 23/04* (2006.01)
  *F02C 9/48* (2006.01)

(52) U.S. Cl.
  CPC .............. *F02C 7/14* (2013.01); *B64D 33/08* (2013.01); *F02C 7/06* (2013.01); *F02C 9/48* (2013.01); *F04B 23/04* (2013.01); *F05D 2220/323* (2013.01); *F05D 2260/232* (2013.01)

(58) Field of Classification Search
  CPC ..... F02C 7/06; F02C 7/14; F02C 9/48; B64D 33/08; F04B 23/04
  See application file for complete search history.

(56) References Cited

U.S. PATENT DOCUMENTS

| | | | |
|---|---|---|---|
| 4,137,705 A * | 2/1979 | Andersen | F28D 9/0025 60/728 |
| 4,151,710 A | 5/1979 | Griffin et al. | |
| 4,696,156 A * | 9/1987 | Burr | B64D 37/34 60/39.08 |
| 5,241,814 A * | 9/1993 | Butler | F02C 7/14 60/39.08 |
| 5,615,547 A | 4/1997 | Beutin et al. | |
| 6,237,322 B1 | 5/2001 | Rago | |
| 6,487,862 B1 * | 12/2002 | Doorley | F01D 15/06 60/778 |
| 7,506,724 B2 | 3/2009 | Delaloye | |
| 7,793,505 B2 | 9/2010 | Dooley | |

(Continued)

FOREIGN PATENT DOCUMENTS

| | | |
|---|---|---|
| CN | 215944912 U * | 3/2022 |
| EP | 3 225 793 A1 | 10/2017 |
| WO | 2014/200587 A2 | 12/2014 |

OTHER PUBLICATIONS

UK Intellectual Property Office, Combined Search and Examination Report under Sections 17 and 18(3), dated May 28, 2021, pp. 1-4.

*Primary Examiner* — Craig Kim
(74) *Attorney, Agent, or Firm* — Hackler Daghighian Martino & Novak

(57) ABSTRACT

A method of controlling the oil flow in an engine is provided. In preferred embodiments, the method comprises: flowing oil to a first oil pump upstream or downstream of a fuel oil heat exchanger and flowing oil to a second oil pump upstream or downstream of an air oil heat exchanger. One of two control functions to control the oil mass flow rate through the first oil pump is selected wherein the first control function minimizes specific fuel consumption ("SFC") by the engine and the second control function minimizes average oil temperature. Preferably, the oil pumps are electric and the total combined oil mass flow rate of the first and second oil pumps is maintained constant.

18 Claims, 15 Drawing Sheets

(56) References Cited

U.S. PATENT DOCUMENTS

| | | | |
|---|---|---|---|
| 8,261,527 B1* | 9/2012 | Stearns | F02C 7/06 |
| | | | 60/39.83 |
| 8,776,952 B2 | 7/2014 | Schwarz et al. | |
| 8,887,869 B2 | 11/2014 | Pisseloup | |
| 8,997,449 B2 | 4/2015 | Logan | |
| 9,051,056 B2 | 6/2015 | Leese | |
| 9,097,169 B2* | 8/2015 | Logan | F02C 7/06 |
| 9,739,198 B2* | 8/2017 | Gameiro | F02C 7/12 |
| 10,107,198 B2* | 10/2018 | Stearns | F02C 7/224 |
| 10,151,242 B2 | 12/2018 | Keeler | |
| 10,196,936 B2* | 2/2019 | Stearns | F01M 1/12 |
| 10,352,241 B2 | 7/2019 | Snape et al. | |
| 2005/0081507 A1* | 4/2005 | Tumelty | F01D 25/20 |
| | | | 60/39.08 |
| 2011/0185731 A1* | 8/2011 | Mylemans | F01D 25/18 |
| | | | 60/645 |
| 2013/0086909 A1* | 4/2013 | Wang | F02C 9/36 |
| | | | 60/730 |
| 2014/0010635 A1* | 1/2014 | Wiedemann | F01D 25/12 |
| | | | 415/118 |
| 2015/0044036 A1* | 2/2015 | Fitzpatrick | F02C 7/14 |
| | | | 184/6.1 |
| 2016/0258324 A1 | 9/2016 | Cigal et al. | |
| 2016/0265438 A1* | 9/2016 | Keeler | F02C 7/14 |
| 2017/0159569 A1* | 6/2017 | Miller | B64D 37/02 |
| 2017/0167387 A1 | 6/2017 | Weir et al. | |
| 2017/0284351 A1* | 10/2017 | Incerpi | F01D 25/20 |
| 2017/0314473 A1* | 11/2017 | Morreale | F04D 29/056 |
| 2020/0332716 A1* | 10/2020 | Ribarov | F02C 7/14 |
| 2021/0325300 A1* | 10/2021 | Lei | G01N 21/41 |

\* cited by examiner

FOHE oil mass flow rates for two control options

| Engine rating | Column A Fuel temperature control, SLS (Mexico City Airport Altitude) | | | Column B Average oil temperature control |
|---|---|---|---|---|
| | Cold | ISA | Hot | Cold/Isa/Hot |
| Idle | 7.4 (7.4) | 7.4 (7.4) | 7.3 (7.2) | 0.5 |
| Take off | 7.4 (7.4) | 7 (6.8) | 1.5 (1.0) | 3.5 |
| Top of climb | 6.4 | 1.1 | 0.2 | 2 |
| Start of Cruise | 6.6 | 2.8 | 0.2 | 1.5 |
| Start of Descent | 6.7 | 5.5 | 0.2 | 1 |
| Approach | 7.4 (7.4) | 7.3 (7.3) | 7 (7.0) | 1 |

FIG. 4

Possible reduction in oil average temperature and trade-off on engine SFC

|  |  | Cold day | ISA | Hot day |
|---|---|---|---|---|
| Idle | T avg oil reduction | 110°C | 80°C | 50°C |
|  | SFC impact | negligible | negligible | negligible |
| Take-off | T avg oil reduction | 80°C | 25°C | 0°C |
|  | SFC impact | 0.4% - 0.6% | 0.2% - 0.5% | 0% |
| End of climb | T avg oil reduction | 15°C | 0°C | 0°C |
|  | SFC impact | 0.1% | 0% | 0% |
| Start of cruise | T avg oil reduction | 15°C | 0°C | 0°C |
|  | SFC impact | 0.1% | 0% | 0% |
| Start of descent | T avg oil reduction | 15°C | 7°C | 0°C |
|  | SFC impact | 0.1% | 0.05% | 0% |
| Approach | T avg oil reduction | 90°C | 50°C | 30°C |
|  | SFC impact | 0.1% | 0.1% | 0.1% |

*FIG. 5*

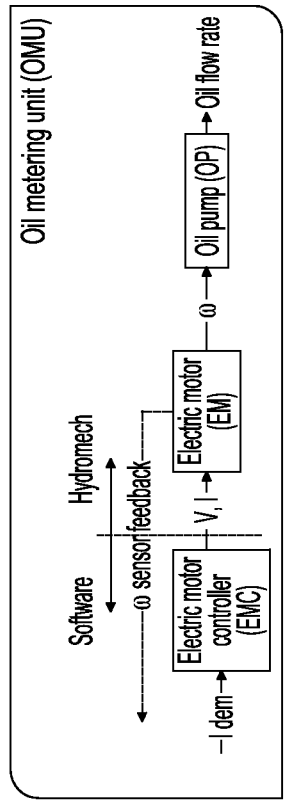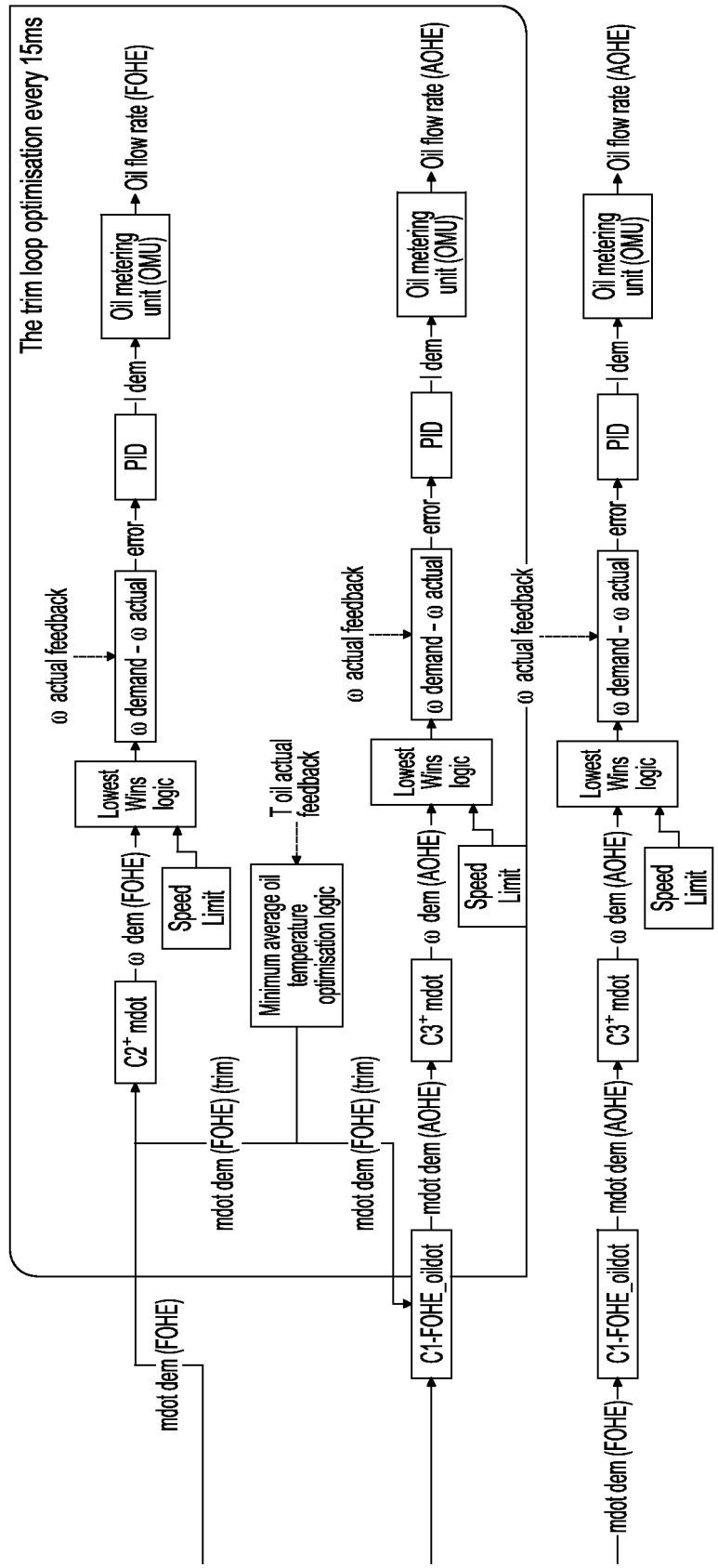
FIG. 8B

ENGINE THERMAL MANAGEMENT METHODS AND CONTROL SYSTEMS

FIELD

The present patent document relates generally to thermal management of engines. More specifically, the present patent document relates to methods of controlling the flow of oil through an engine using oil pumps that are decoupled from the rotational speed of the engine, such as electrically operated oil pumps, in order to better manage the temperature and performance of the engine.

BACKGROUND

To improve engine specific fuel consumption, engine manufacturers increase bypass ratio by making larger fan blade diameters. However, this leads to larger nacelle weight and cowl drag which is undesirable. This can be alleviated by moving some components that are installed in the nacelle to the core of the engine—thus making the nacelle slimmer and aerodynamically efficient. However, with such an arrangement, there is less space overall for heat dissipating equipment.

For the next generation of Ultra High Bypass Ratio (UHBR) turbofans, engine manufacturers are introducing a power gearbox between the fan and low-pressure turbine. The power gearbox transmits a large amount of power from the LP turbine to the fan, and even with high mechanical efficiencies it generates a large amount of waste heat that needs to be managed to satisfy safe and reliable operation of the engine.

The heat generated from the power gearbox and other engine oil system components such as bearings and the accessory gearbox is managed by the Thermal Management System (TMS). The primary function of the TMS is to cool the oil to enable engine components that generate excess heat which are cooled by the oil to operate safely and reliably. The secondary function of the TMS is to manage excess heat in the most efficient manner, to minimize the impact of the TMS on fuel consumption. The TMS uses engine oil, whose primary function is to lubricate and cool engine components, with a secondary function of transporting heat from the heat source to the heat sink.

As the result of thermal cycling and high temperatures, the oil degrades because of oxidative and thermal breakdown. This manifests itself as increased viscosity and higher total acidity which leads to lower oil performance. Unacceptably high oil temperature reduces oil viscosity and increases the oxidation rate or breakdown of the oil. It also impacts component life because of the higher component temperatures coupled with reduced oil lubricating film thickness on contacting gear teeth and bearing surfaces that increases wear. High oil temperature can also reduce the life of the shaft contact oil seals. Therefore, to achieve engine component design life, the operating oil temperature should be maintained within the working temperature range of the oil; and to improve design life the oil temperature should be reduced.

Typically, the primary heat sink on the engine is the fuel, and the secondary heat sink is the bypass-air. It is preferable to transfer heat primarily into fuel prior to combustion as by doing so, the energy is maintained within the engine, which improves thermal efficiency and specific fuel consumption. Low emissions combustion systems also have a reduced limit on the maximum allowable temperature of the fuel prior to combustion, which then limits the maximum amount of heat that the TMS can transfer into the fuel. The remaining heat is transferred into the bypass air, which is only partially recovered by the thermodynamic cycle, thus reducing engine thermal efficiency.

On future engines in which significant heat load will be generated through the use of a power gearbox, a much higher amount of heat will have to be managed using these available heat sinks.

On conventional TMSs, the oil mass flow is provided by a mechanical positive displacement type pump. The oil pump is driven via a bevel gear by an engine shaft and the amount of oil flow to the engine is proportional to rotational speed because of the pump characteristic. Thus, it is the engine rotational speeds that dictate the amount of oil provided for lubrication, and hence the peak oil temperatures during engine operation.

It would be advantageous to have a TMS that firstly sustains engine component life by limiting peak oil temperatures while providing satisfactory oil mass flow rates, and secondly provides the best engine thermal efficiency by transferring heat primarily to the fuel heat sink.

U.S. Pat. No. 8,261,527 titled "GASTURBINE ENGINE WITH GEARED TURBOEAN AND OIL THERMAL MANAGEMENT SYSTEM WITH UNIQUE HEAT EXCHANGER STRUCTURE" to Stearns et al. (hereinafter '527 Patent) teaches a system and methods for controlling oil temperatures in a gas turbine engine. The '527 Patent, a valve 76 is used to route oil between the Fuel Oil Cooler 144 and the Air Oil Cooler 68 to achieve the desired temperature of the fuel. See '527 Patent, lines 25-27. The TMS disclosed in the '527 Patent always prioritizes maximizing heat transfer to fuel across all engine ratings, thus achieving the best engine specific fuel consumption ("SFC") at all flight points. While SFC is important, there may be times when it is desirable to optimize parameters other than SFC.

SUMMARY OF THE EMBODIMENTS

Objects of the present patent document are to provide an improved TMS for engines and in particular gas turbine engines. Preferably, embodiments of the present patent document can provide increased engine component life and optimization for engine performance parameters other than SFC. In order to achieve these objectives, TMS systems are provided that include one or more oil pumps that are decoupled from the rotational speed of the engine such that oil can flow to the Fuel Oil Heat Exchanger ("FOHE") and Air Oil Heat Exchanger ("AOHE") at rates not linked to the engine rotational speed. Preferably, the one or more oil pumps are electrical oil pumps and are part of an electrical TMS.

To this end, a new method of controlling the oil flow in an engine is provided. In a preferred embodiment, the method of controlling the oil flow in an engine comprises: flowing oil to a first oil pump upstream or downstream of a fuel oil heat exchanger; flowing oil to a second oil pump upstream or downstream of an air oil heat exchanger; and selecting between two control functions to control an oil mass flow rate through the first oil pump (FOHE oil pump) wherein a first control function minimizes specific fuel consumption ("SFC") by the engine and a second control function minimizes average oil temperature.

In preferred embodiments, the method further comprises the step of controlling the mass flow rate through the second oil pump to keep a combined total mass flow rate of both the first oil pump and the second oil pump constant.

In preferred embodiments, both the first oil pump and the second oil pump are electrical oil pumps. However, in some embodiments, the first oil pump and second oil pump are mechanically decoupled from the rotation of the engine. In embodiments where the oil pumps are mechanical but mechanically decoupled from the rotational speed of the engine, variable geometry pumps may be used.

In preferred embodiments, the second control function, which seeks to minimize oil temperature, may make a check of a number of other variables before driving the oil temperature to a minimum. For example, the second control function may seek a minimum average oil temperature without exceeding an acceptable penalty to SFC. In yet other embodiments, the second control function maintains the fuel temperature below its maximum allowable limit.

In some embodiments, the second control function determines a starting point for the oil mass flow rate to the first pump (FOHE oil pump) at particular flight points using a lookup table. In some embodiments, if the second control function determines the fuel temperature will exceed its maximum allowable limit, the first control function is used.

The control system may choose to use control function one or control function two at different operating times of the engine. These operating times may correspond to different flight points such as take-off, idle, cruise or landing to name a few. In some embodiments, the second control function is used for all aircraft operating modes except cruise.

BRIEF DESCRIPTION OF THE DRAWINGS

FIG. 4 illustrates exemplary FOHE oil mass flow rates for two modes of engine operation where the combined total maximum oil flow for both pumps is 7.5 kg/s;

FIG. 5 illustrates a table of exemplary examples of the possible reduction in oil average temperature and the trade-off on engine SFC;

Figure 1:
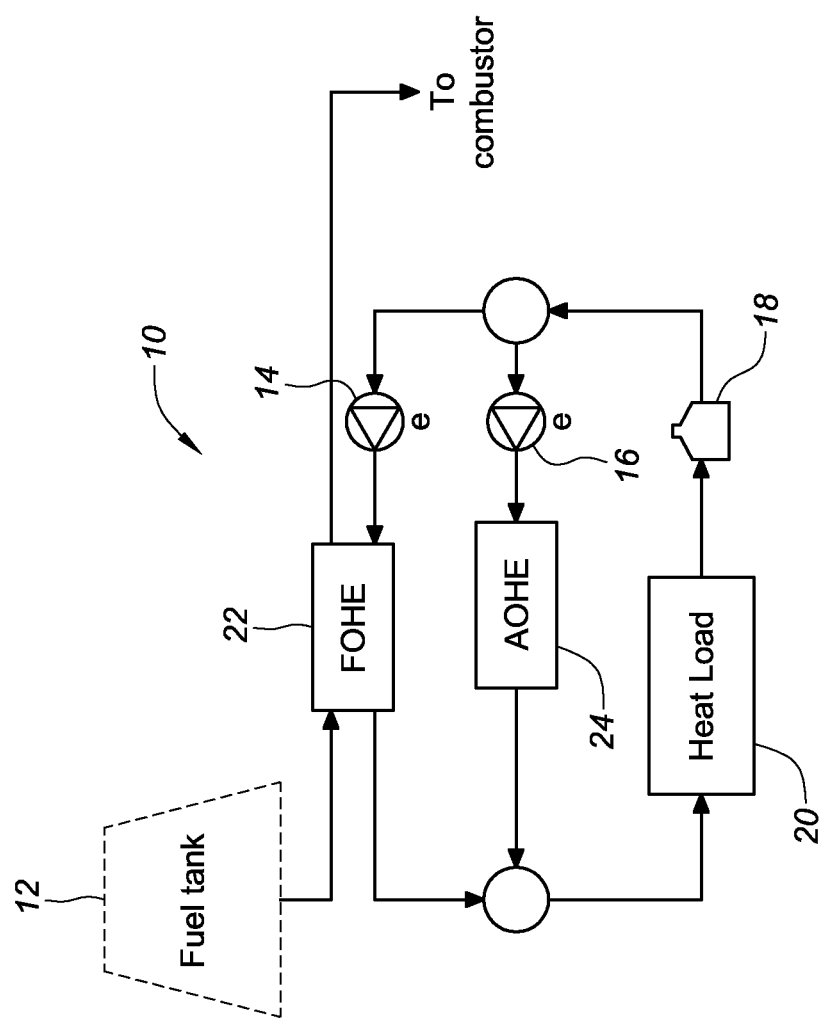
FIG. 1 illustrates a schematic view of a thermal management system that includes two oil pumps that are decoupled from the engine rotation.
Figure 7A:
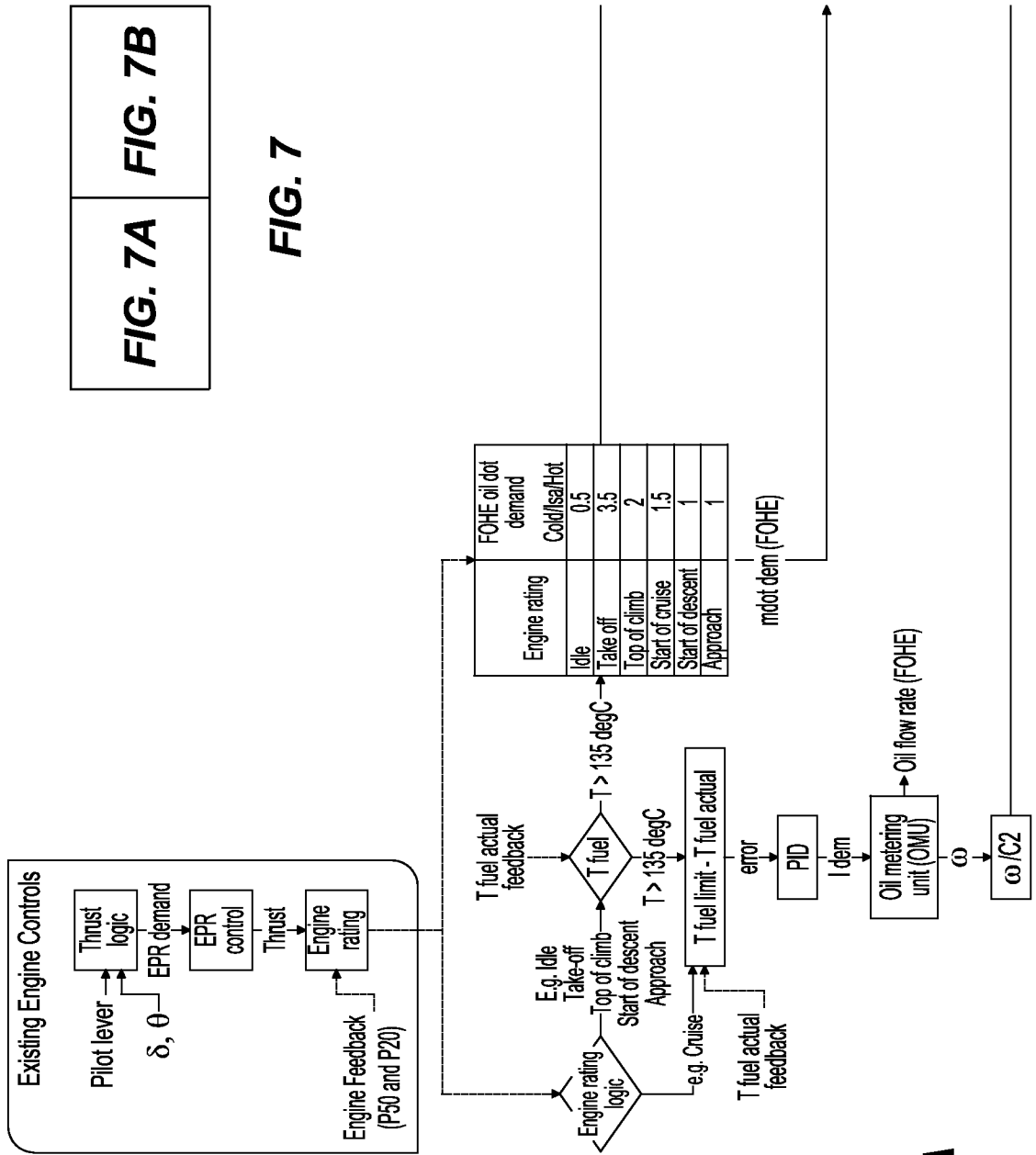
Figure 7B:
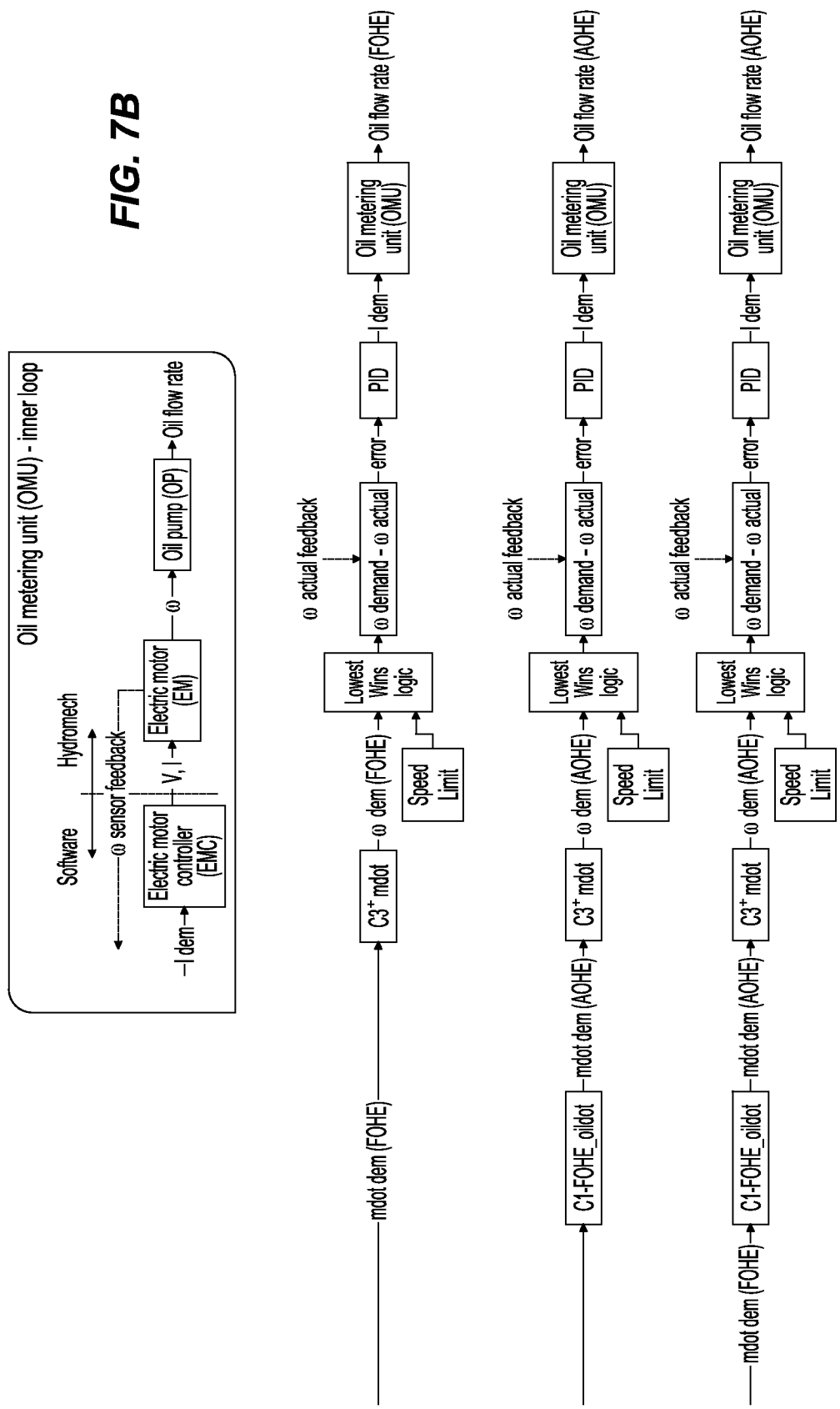
Figure 8A:
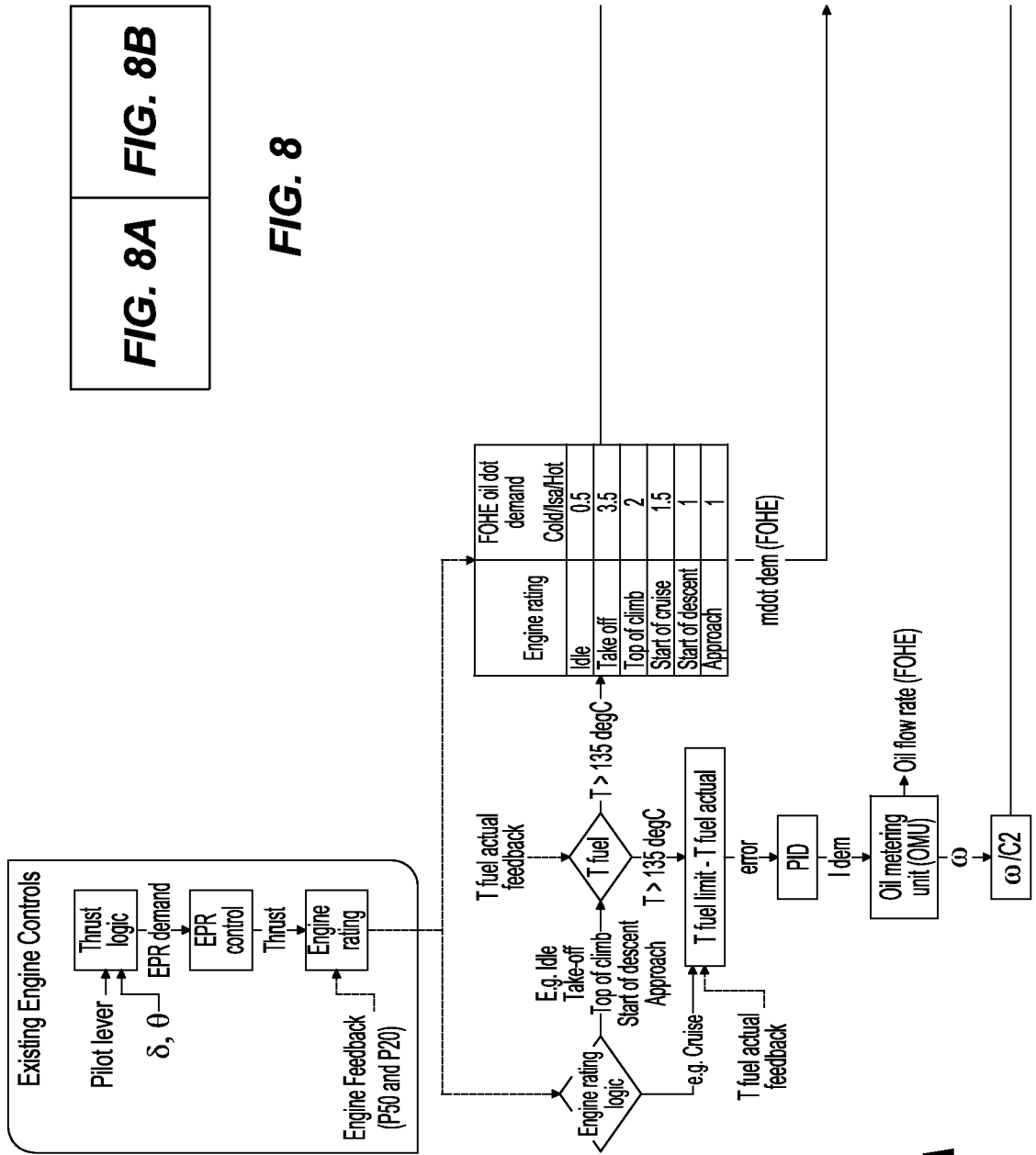
Figure 9:
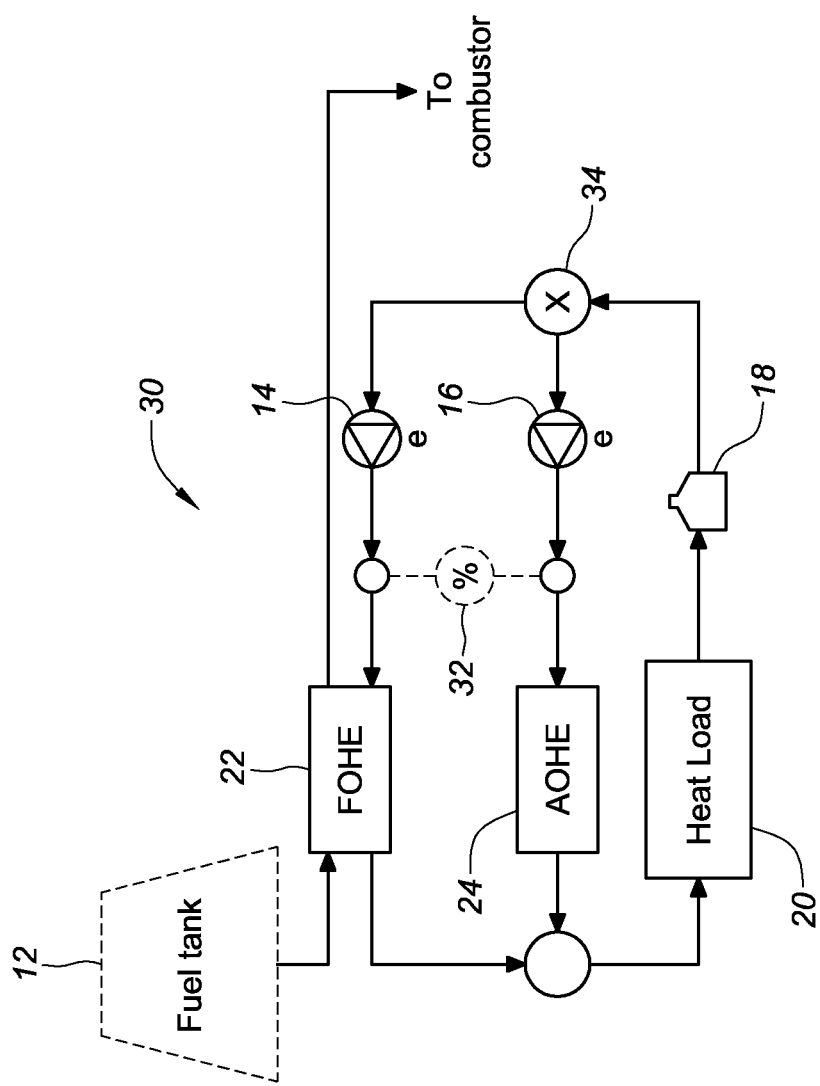

Combined FIGS. 7A and 7B schematically illustrates an exemplary embodiment of a control system to minimize average oil temperature or minimize SFC by maximizing fuel temperature depending upon flight condition, using a look-up-table;

Combined FIGS. 8A and 8B schematically illustrates the control system of FIG. 7 with a trim loop added;

FIG. 9 illustrates a TMS similar to the TMS of FIG. 1 but with the inclusion of a variable flow valve and a non-return valve.

Figure 10:
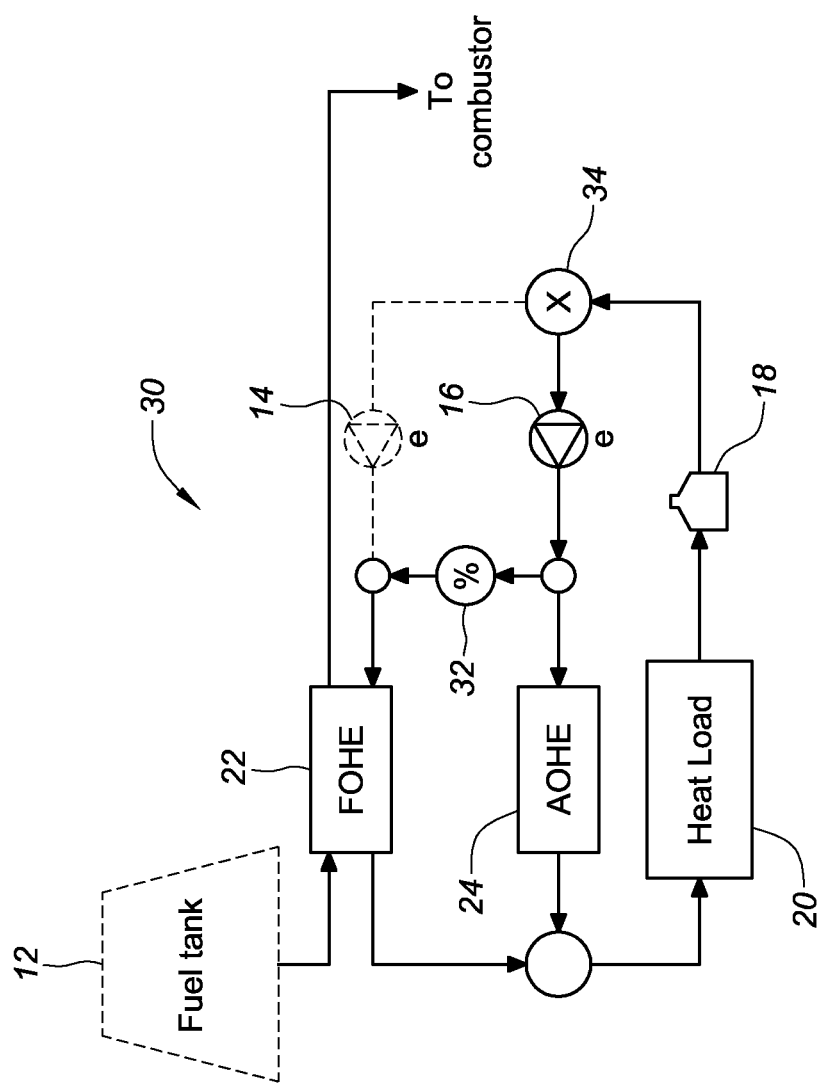
Figure 11:
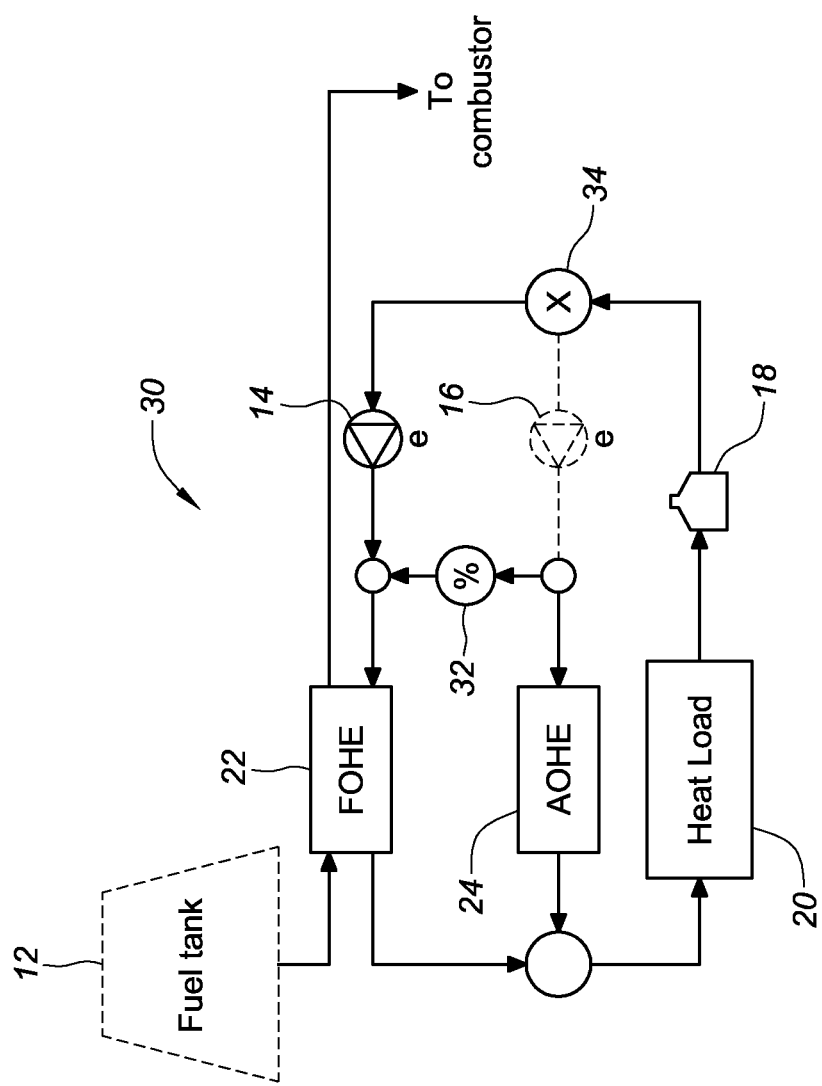
Figure 12:
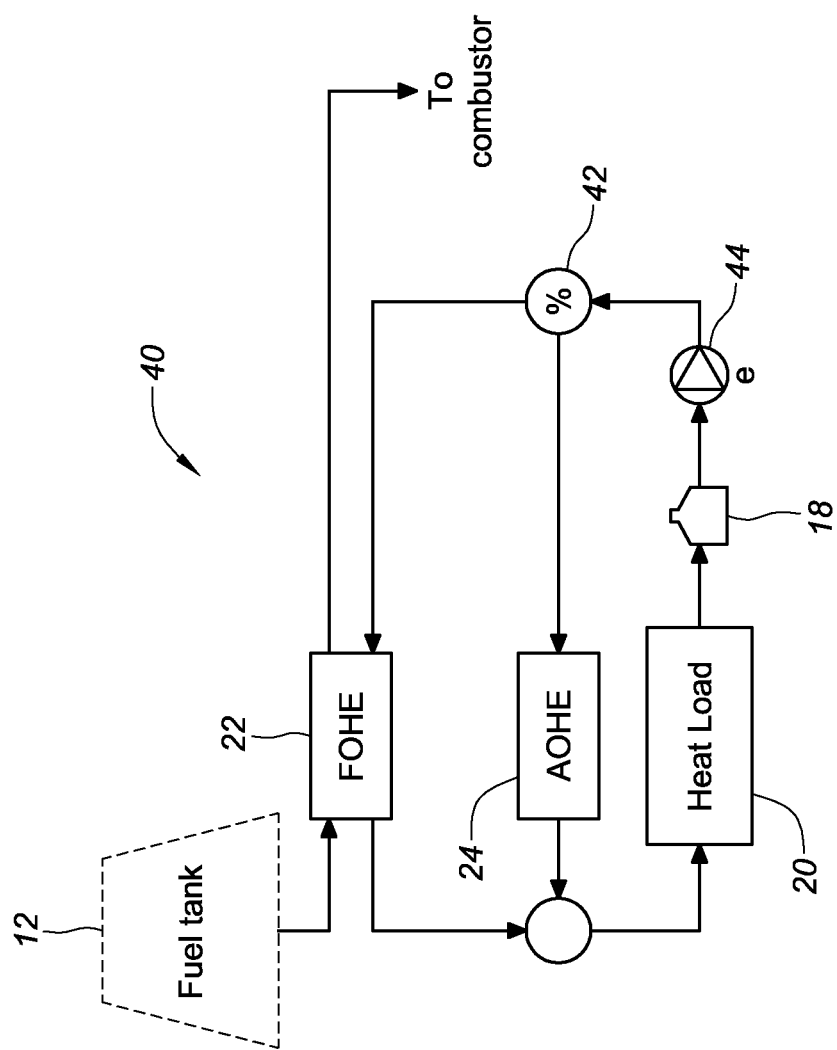
Figure 13A:
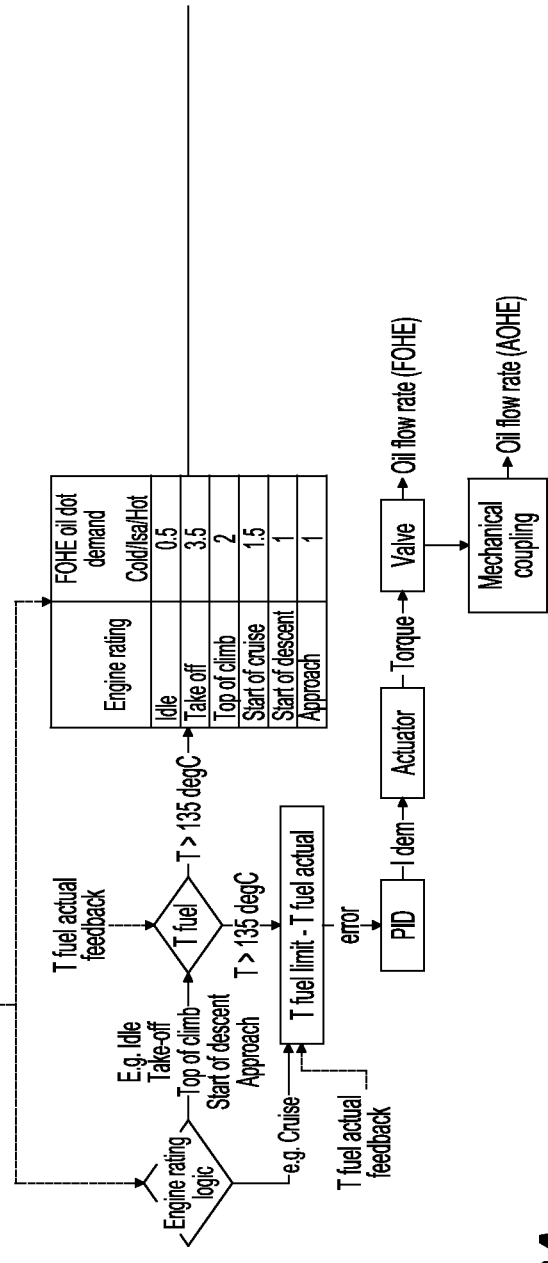
Figure 13:
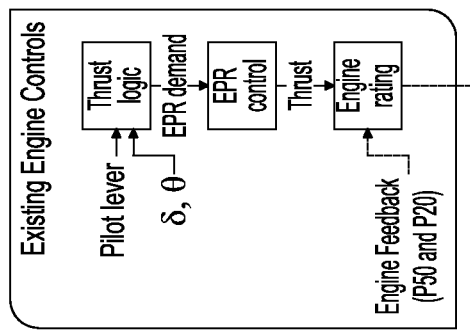
Figure 13B:
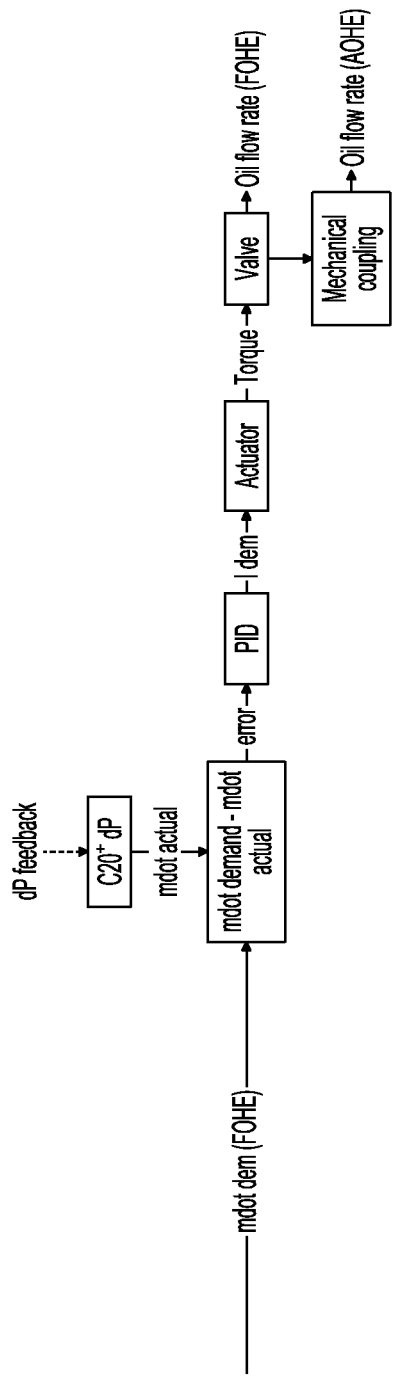

FIG. 10 shows the TMS of FIG. 9 with a failed oil pump upstream of the FOHE;

FIG. 11 shows the TMS of FIG. 9 with a failed oil pump upstream of the AOHE;

FIG. 12 illustrates an embodiment of a TMS that can optimize for both SFC and minimum average oil temperature using a single oil pump that is decoupled from the engine and a three-way control valve;

Combined FIGS. 13A and 13B schematically illustrates one embodiment for a control system for the TMS of FIG. 12.

DETAILED DESCRIPTION OF THE PREFERRED EMBODIMENTS

The thermal management systems ("TMS") that are being described herein use oil pumps that are decoupled from the rotational speed of the engine. Engine refers to any engine, motor, turbopump, turbo fan or in particular, gas turbine engine. The decoupling of the oil pump from the motor allows the oil pump to pump oil at any rate that is desirable, independent of the engine shaft speed. In preferred embodiments, electric oil pumps may be used but in other embodiments, any oil pump that can pump oil independently from the rotational speed of the engine may be used. In some embodiments, mechanical oil pumps may still be used assuming they have been mechanically decoupled from the engine rotation such that the mass flow rate of the oil being pumped is not required to be proportional to the engine rotational speed. As just one example, a variable geometry oil pump may be used.

The terms "oil" and "lubricant" are used interchangeably in this application and cover a fluid used to lubricate surfaces subject to relative rotation.

As expressed above, the oil pumps are preferably electrical oil pumps. Embodiments that include electrical oil pumps may be referred to as an electrical TMS or ("e-TMS"). An e-TMS contains oil pumps driven by electric motors rather than the pumps being mechanically connected to an engine shaft. Decoupling the oil pumps from the engine shaft allows significantly increased capability to the TMS and such systems may be used to optimize for parameters other than SFC.

FIG. 1 illustrates a schematic view of a thermal management system ("TMS") 10 that includes two oil pumps 14 and 16 that are decoupled from the engine rotation. In preferred embodiments the oil pumps 14 and 16 are electrical oil pumps. The electric oil pumps 14 and 16 are preferably positive displacement oil pumps driven by electrical motors. However, in other embodiments, the oil pumps 14 and 16 may be mechanical oil pumps that are mechanically decoupled from the engine rotation.

In the embodiment shown in FIG. 1, a first oil pump 14 is installed upstream of the Fuel Oil Heat Exchanger ("FOHE") 22. However, the first oil pump 14 may be installed upstream or downstream of the FOHE 22. In the embodiment shown in FIG. 1, a second oil pump 16 is installed upstream of the Air Oil Heat Exchanger ("AOHE") 24. However, the second oil pump 16 may also be installed upstream or downstream of the AOHE 24.

In the embodiment shown in FIG. 1, the first and second oil pumps 14 and 16 pull oil form the oil reservoir 18 and direct the oil to either the FOHE 22 or the AOHE 24. The FOHE 22 sits between the fuel tank 12 and the combustion fuel nozzles. The FOHE 22 exchanges heat between the oil and the fuel prior to combustion. The AOHE 24 exchanges heat between the air flowing through the engine (i.e. atmosphere) and the oil. The AOHE is equivalent to dumping heat to the environment.

Because each of the first oil pump 14 and the second oil pump 16 are decoupled from the engine rotation, the mass flow rates through the oil pumps 14 and 16 can be controlled independently of the engine rotational speed, engine operational point and each other. This provides incredible flexibility in how the TMS 10 system operates. For example, the TMS 10 can provide the capability to either minimize SFC or instead, minimize average oil temperature.

Figure 3:
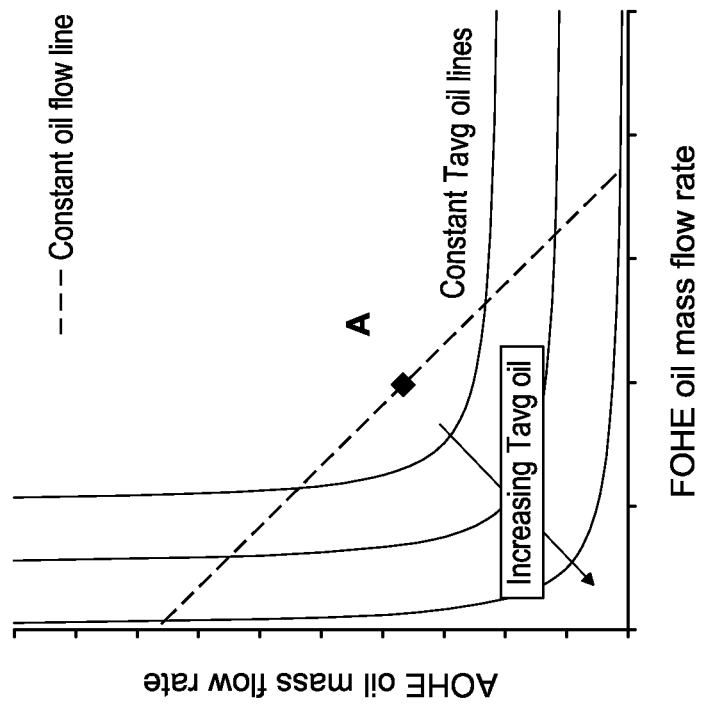
FIG. 3 is a graph that illustrates the average oil temperature characteristics of the representative TMS of FIG. 1 across all engine operations points.
Figure 2:
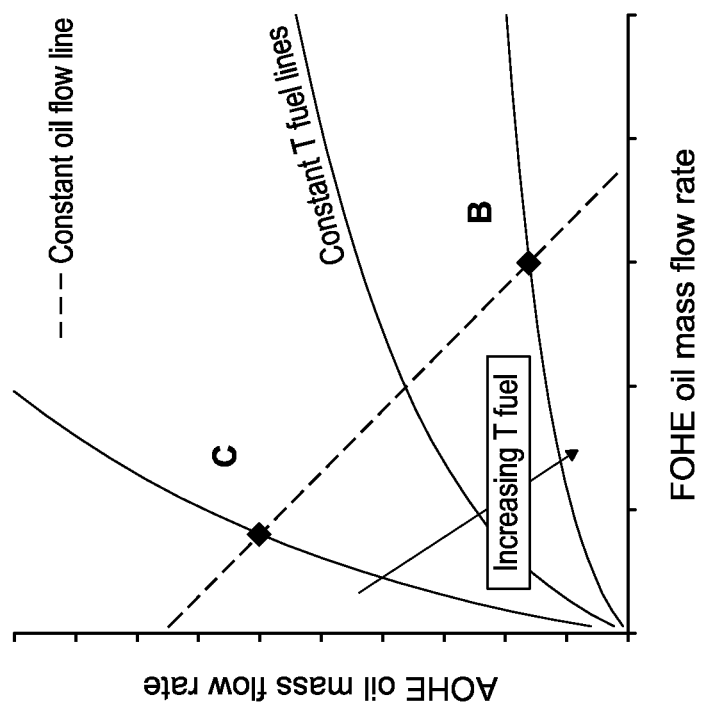
FIG. 2 is a graph that illustrates the fuel temperature characteristics of the representative TMS of FIG. 1 across all engine operations points.

FIG. 2 is a graph that illustrates the fuel characteristics of the representative TMS 10 of FIG. 1 across all engine operations points. FIG. 3 is a graph that illustrates the average oil temperature characteristics of the representative TMS of FIG. 1 across all engine operations points. In both FIG. 2 and FIG. 3, the x-axis corresponds to the oil mass flow rate through the FORE 22, and the y-axis corresponds to the oil mass flow rate through the AOHE 24. Because the oil pumps 14 and 16 are decoupled from the engine rotational speed, the oil mass flow rates can be varied to minimize either SFC or oil temperature at different flight points across the engine operational envelope.

As may be appreciated, because each oil pump 14 and 16 are decoupled from the engine rotational speed and may also be operated independently of each other, the mass flow rate of oil through the FOHE, AOHE and the total mass flow rate of oil through the engine, may all be controlled. For example, if the mass flow rate of oil to the FOHE is increased, the total mass flow rate of oil through the engine will also increase unless the mass flow rate of oil through the AOHE is decreased. Similarly, if the mass flow rate of oil to the AOHE is increased, the total mass flow rate of oil through the engine will also increase unless the mass flow rate of oil through the FOHE is decreased. All of these capabilities are possible depending on the programming of the oil flow rate control functions.

Returning to FIGS. 2 and 3, each of the three solid lines in each of the graphs represents an example of the oil flow rates to the FOHE 22 and AOHE 24 to maintain a constant fuel temperature and constant oil temperature, respectively, at different engine operations points, i.e. idle, takeoff, landing etc. The authors of this patent document have discovered that the TMS 10 of FIG. 1 provides attractive characteristics when the combined total oil mass flow rate of the first and second oil pumps 14 and 16 is kept constant. This is depicted by the dashed line shown in FIGS. 2 and 3. Maintaining a constant combined total mass flow rate for the flow rates of the first and second oil pumps 14 and 16 is favorable for two reasons: 1.) it significantly reduces complexity of the control system, and 2.) at any engine speed it facilitates a higher oil flow into that engine components, which maintains a lower working temperature and improves component life.

As may be seen in FIG. 2, the lines of constant fuel temperature intersect the constant oil flow rate at points B and C. Point B could represent intersection with the constant fuel temperature line at the idle engine operating point, whereas point C could represent intersection with the constant fuel temperature at take-off on a hot day. Each engine rating will have a distinct characteristic map of fuel temperature with an intersection point at which fuel is at its maximum allowable temperature. In any operational condition, increasing FOHE oil mass flow rate by moving down towards the x-axis along the constant oil flow line will increase fuel temperature. There is a maximum allowable fuel temperature for fuel stability and coking which is typically around 135° C. Any further increase in FOHE oil mass flow rate with a corresponding decrease in AOHE oil mass flow along the constant oil flow line that exceeds the maximum allowable fuel temperature will be unacceptable.

Moving to FIG. 3 and the control of the TMS for minimum average oil temperature, the lines of constant average oil temperature indicate a theoretical intersection point A with the constant oil mass flow line, at which a minimum oil temperature is reached. From point A, any further increase or decrease in FORE oil mass flow will increase average oil temperature. Thus, along the constant oil mass flow line, the average oil temperature exhibits a parabolic U-shape characteristic with one minimum point. This is a favorable characteristic that significantly reduces the complexity of the control system. Each engine rating will have distinct characteristic map of average oil temperature with a point of minimum temperature intersecting the constant oil flow line.

Because of the fuel temperature limitations, the region on the characteristic map below the constant fuel line (e.g. 135° C. line) is considered an unacceptable operating zone, and the region above is considered acceptable. If at a particular engine rating, point A resides in an unacceptable region such as limiting fuel temperature intersects at point C—the minimum oil temperature cannot be achieved and the TMS 10 control system would limit operation to point C. If at another particular engine rating, point A is in the acceptable region such that the limiting fuel temperature intersects at point B—the minimum average oil temperature can be achieved and the control system can choose between operation at maximum fuel temperature point B which is the best for engine SFC, or minimum average oil temperature point A, which is the best for engine component life with minimal penalty in engine SFC.

At any engine operating point the TMS control system 10 enables a choice between two modes of control: 1) a first control function to control the engine to the best SFC by maximizing heat delivered to the fuel—i.e. operating at points B or C in FIG. 2, and 2) a second control function to control to the lowest average oil temperature provided that the fuel temperature is below its maximum allowable limit—i.e. operating at point A in FIG. 3.

FIG. 4 illustrates exemplary FOHE oil mass flow rates where the combined total maximum oil flow for both pumps is 7.5 kg/s. In other embodiments, other total combined oil mass flow rates may be used. In column A, the FOHE flow rate to achieve the maximum allowable fuel temperature is shown across a series of engine ratings. The required oil mass flows across the FOHE and AOHE for achieving the maximum allowable fuel temperature are dependent on the ambient temperature and pressure.

In column B, the FOHE oil mass flow rate is shown at which the minimum average oil temperature is achieved across a series of engine ratings. An advantageous characteristic of the average oil temperature map is that the location of point A is independent of changes in ambient temperature and pressure. Being able to control the oil flow rate to achieve a minimum average oil temperature independent of ambient pressure and temperature is an unexpected result. As may be seen, this allows each engine rating to have a fixed FOHE and AOHE oil mass flow rate as shown in column-B in Table 1. This is a favorable and unexpected system characteristic because it significantly reduces the complexity in the control laws.

Notice in Table 1 that for example, at take-off, the FOHE oil mass flow rate in column-B is higher than in column-A on a hot day. This indicates that the TMS 10 will not be able to achieve minimum average oil temperature at 3.5 kg/s because the fuel temperature is limited at the oil flow rate of 1.5 kg/s. However, at ISA and cold day operation, the opposite is true.

Controlling the oil flow rates to minimize average oil temperature results in a fuel temperature below its maximum limit; therefore, there will be a penalty on the engine SFC because the fuel is not receiving the maximum amount of heat that it is capable of absorbing. FIG. 5 illustrates a table of exemplary examples of the possible reduction in oil average temperature and the trade-off on engine SFC. The 0% entries in the table indicate that fuel is at its limit restricting any reduction in average oil temperature, such as the hot day take-off case described previously. Notice that significant reductions in average oil temperature are possible with a small penalty in engine SFC. For off-design points, such as idle or take off, the fuel burnt is a relatively small part of that for the overall mission so the small increase in SFC is a very good trade for the increased component life resulting from the lower oil temperature and higher oil flow.

We now turn to the design of the control system. The main requirement for engine control is always to facilitate smooth and safe operation across the complete flight envelope. The control system should meet performance requirements in terms of acceleration, deceleration, and shutdown, while ensuring that mechanical limits such as shaft speed, and certain temperatures and pressures are not exceeded.

Any engineering system that needs to be controlled contains two fundamental elements—the controlled variables (C1, C2 . . . Cn) that need to be kept at their target value, and manipulated variables (M1, M2 . . . Mn) are the levers to interact with the process.

A TMS control method can be either single variable or multi variable. The single variable controller measures one and only one variable, decides if its value is acceptable, and applies corrective actions if necessary. The multi-variable controllers are used when more than one control objective needs to be met, and usually, an interaction exists between the manipulating variables. In other words, change to one manipulated variable, M1, will cause desired change in control C1, but also unwanted change in control C2 and vice versa. Multi-variable controls are challenging and require complex design methods to decouple variables so single variable PIDs (Proportional-Integral-Differential control loops) can be used for each control loop without affecting the other control loops.

The TMS with two oil pumps decoupled from the aircraft engine rotation as taught herein may seem at first glance as a multi-variable control problem. Each heat exchanger has its own oil pump that controls the mass flows into the FORE and AOHE independently. Downstream of the heat exchangers the mixing will take place and will result in a change in oil temperature depending on the amount of mass flowing across each heat exchanger. Thus, changing FOHE mass flow rate will not only affect the FORE but also the AOHE because the oil temperature at their inlets will vary—which is a multi-variable control problem. This would require complex control laws to de-couple the signals and allow the PIDs to be tuned individually. However, as taught herein, it is possible to use a control system design that achieves single variable control. This leads to a significant simplification having a single-variable control problem where an independent PID controller regulates the FOHE oil mass flow rate, and a second independent PID controller regulates the AOHE oil flow to a value of:

$$\dot{m}_{AOHE} = \dot{m}_{total} - \dot{m}_{FOHE}$$

The motor rotational speed is typically related to the voltage and torque according to the equation:

$$\omega = \frac{V}{k} - \frac{T}{k^2} R$$

Where V is voltage, T is torque, R is resistance, and k is a constant.

Figure 6:
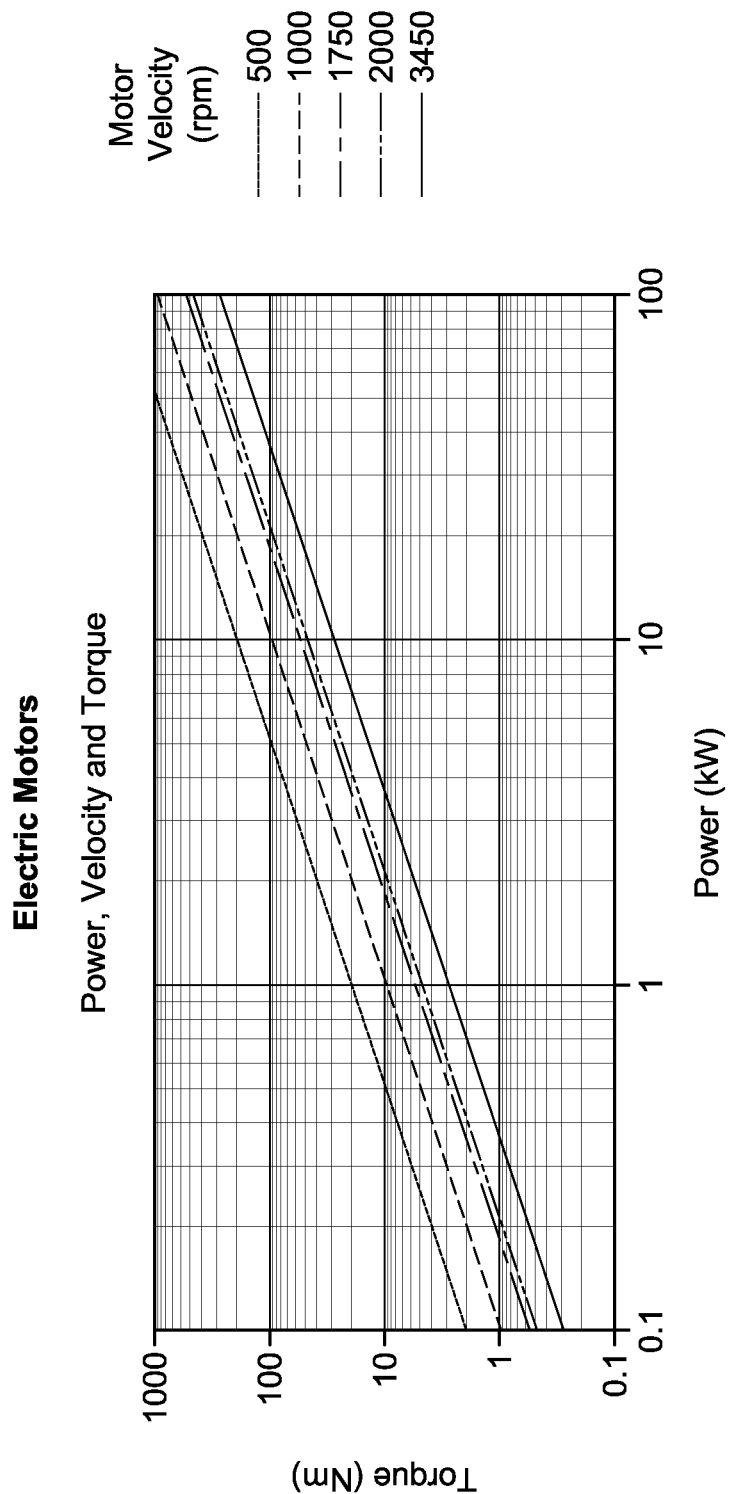
FIG. 6 is a graph that illustrates the relationship between rotational speed and load for a typical electrical motor in a constant 28V system.

Thus, for aircraft systems where voltage is usually constant at 28V, if the motor load is increased, the rotational speed is reduced. This is illustrated on a typical electric motor characteristic map as shown in FIG. 6. The torque can be thought of as flow resistance or a required pressure rise across a flow pump, while motor velocity can be thought of as rate of flow using a positive displacement pump. Accordingly, in TMS systems that use electrical oil pumps, the control system has to continuously adjust the amount of power, which at constant voltage is regulated by the current supply, to deliver the required rotational speed to the pump at various torque levels. In other words, motor velocity is the controlling variable and current supply is the manipulating variable in the control system.

The control system regulates the amount of oil mass flow into the FOHE and AOHE, and facilitates two functions: control-function-1 regulates the thermal management system to give the best SFC by maximizing heat transferred to the fuel, and control-function-2 regulates the thermal management system to give the lowest average oil temperature with an acceptable penalty to engine SFC.

Where electrical oil pumps are used, a PID controller can be used to control the amount of current into the electric motors. In the case of control-function-1, the outputs to the PID controller can be controlled within a logical loop that seeks to minimize the error between measured fuel temperature and a set target (e.g. 135° C.). Thus, the oil mass flow into the FOHE will be controlled such that the fuel temperature doesn't exceed its limit, while the remainder of the oil will flow into the AOHE.

Control laws for control-function-2 are more complicated. Whereas control-function-1 has a clearly pre-determined set target for the PID controller that is agnostic to the engine operation, the target for the minimum average oil temperature varies with the operation of the engine. In other words, the minimum average oil temperature will be different at idle, take-off or other flight points. Also, as the engine performance and engine oil deteriorate over its life, the minimum average oil temperature will be different. Thus, the minimum oil temperature must be determined through optimization. The optimization algorithm will seek to minimize average oil temperature and return the corresponding FOHE oil mass flow rate at which this can be achieved across the operational range. In the control system this can either be done in real-time while the engine is operating or off-line making use of look-up tables with pre-determined set targets of FOHE mass flow. In the case of look-up tables, a conventional PID controller can then be used to control the amount of current into the electric motors of the oil pumps, while minimizing the error between measured electric motor speed and the set target obtained from the look up table for each engine rating flight point. When operating to minimize average oil temperature, the control system must ensure that the fuel temperature never exceeds the set maximum limit (e.g. 135° C.), and that the electric motors of the oil pumps never exceed their maximum flow rate either individually or combined. (e.g. corresponding to 7.5 kg/s).

The combined FIGS. 7A and 7B schematically illustrates an exemplary embodiment of a control system to minimize average oil temperature or minimize SFC by maximizing fuel temperature depending upon flight condition using a look-up-table. In this example, all flight points except cruise will be optimized to provide minimum oil temperature (i.e. control-function-2). The outer loop "T fuel" decides whether the fuel temperature is above its limits. If the fuel temperature is below its limit, the logic selects the FOHE oil mass flow requirement from a look-up table at a given engine rating. The AOHE oil flow requirement is then calculated where C1 is the total oil mass flow. The mass flow signals are then converted into rotational speed using constants C2 and C3, assuming the straight-line relationship between speed and flow for a positive displacement pump. The speed signals are then trimmed against the maximum speed permitted inside Lowest Wins logic. PID controllers then provide current to the electric motors driving the oil pumps while minimizing the error between the measured and target rotational speeds. Alternatively (not shown on the diagram) the actual oil mass flow rate can be sensed directly using a flow rate measuring device. The PID controllers could then receive an error signal between demanded and direct actual measurement of oil mass flow rate. A closed loop control system could be formed around the error signal to drive it to zero.

If fuel temperature is above its limit, similar conversions take place. However, in this example, the PID controllers provide current to the electric motors while minimizing the error between measured and target fuel temperature.

If the engine is operating at cruise and wants to minimize SFC (e.g. control-function-1), the engine rating logic block will control the PID controllers to provide electric current to the electric motors of the oil pumps while minimizing the error between measured and maximum allowable target fuel temperature. This will ensure the best engine SFC for the cruise condition is achieved.

The control functions can repeat as often as necessary but typically will repeat at a rate dictated by the frequency at which engine sensors record data, e.g. every 15 ms.

The control functions discussed above are exemplary and many variations are possible. The parabolic U-shape characteristic of average oil temperature at constant total oil mass flow rate (See FIG. 3) can be used to greatly simplify control methods. The U-shape characteristic means there is only one minimum point that can be found by varying FOHE mass flow rate. If average oil temperature at time t+1 is lower than at time t, the FOHE oil flow is increased and the oil temperature will reduce until the point at which it begins to rise which indicates that a global minimum region has been found. Thus, real-time optimization could be done on oil temperature without a need for a look-up table (this embodiment is described below). However, it is important to note that the system has a certain thermal inertia and there will be latency between the cause and effect of electric motor rotational speed change to oil temperature change. Therefore, some flight points outside of cruise, e.g. where an operator could prefer to optimize for minimum average oil temperature, may not have enough time to get to the lowest oil temperature. The solution to this, as described in this embodiment, is to use look-up tables as an initial target, and then have a trim loop to do minor adjustments to the FOHE oil mass flow demand based on the actual measurement of oil temperature, to achieve the minimum possible oil temperature.

To account for the latency in the response of the oil temperature to the adjustment in mass flow rate to the FOHE, a trim loop can be added. The combined FIGS. 8A and 8B schematically illustrates the control system logic of the combined FIGS. 7A and 7B with a trim loop added. The trim loop may be guided by real-time optimization calculations inside the minimum average oil temperature optimization logic block. This control logic stores a history of actual oil temperature readings and accordingly calculates the next FOHE oil mass flow rate demand that over time will minimize the average oil temperature. This computation can be done using a variety of standard mathematical methods to approximate the minimum. Some examples of these mathematical methods include: 1.) Newton method; 2.) Secant method; 3.) Bi-section method; and 4.) Newton-Raphson method.

In yet other embodiments, other control methods may be used. For example, a control logic similar to that illustrated in combined FIGS. 7A and 7B may be used but instead of using a look-up-table real time logic may be used to achieve the minimum average oil temperature. In one example of a real time logical scheme, the control logic could store a history of oil temperatures and calculate the next FOHE oil mass flow rate demand that over time will minimize the average oil temperature while ensuring that the fuel temperature doesn't exceed its limit. This computation can be done using a variety of standard mathematical methods to approximate the minimum. Some example mathematical methods include: 1.) Newton's method; 2.) Secant method; 3.) Bi-section method; and 4.) Newton-Raphson method.

All the of the TMSs discussed above and the various control logics can have improved system redundancy with the introduction of variable flow and non-return valves as shown in FIGS. 9, 10 and 11.

FIG. 9 illustrates a TMS 30 similar to the TMS of FIG. 1 but with the inclusion of a variable flow valve 32 and a non-return valve 34. As may be appreciated, the variable flow valve 32 connects the oil lines between the FOHE 22 and the AOHE 24. In the embodiment shown in FIG. 9, the variable flow valve 32 connects the oil lines on the upstream side of the FOHE 22 and AOHE 24. However, in other embodiments, a downstream configuration may be used. During normal engine operation, the variable flow valve 32 remains inactive and fully closed, while the two electric oil pumps achieve target flow rates into the FOHE 22 and AOHE 24 as set by control laws. In an event of a component failure, e.g. one of the oil pumps 14 or 16 fails, the TMS 30 can maintain safe operation while the operational oil pump achieves higher oil flow rate by the amount of the failed oil pump. FIG. 10 shows the TMS of FIG. 9 with a failed oil pump upstream of the FOHE. FIG. 11 shows the TMS of FIG. 9 with a failed oil pump upstream of the AOHE. This will ensure that the total oil flow rate in the system remains unchanged. Then, the variable flow valve is actuated by a logic control that distributes oil flows between FOHE and AOHE as set by control laws. The control laws of this embodiment can still achieve either control-function-1 or control-function-2 even with a failed oil pump.

FIG. 12 illustrates an embodiment of a TMS 40 that can optimize for both SFC and minimum average oil temperature using a single oil pump 44 that is decoupled from the engine and a three-way control valve 42. In this embodiment, the oil pump 44 is preferably an electric oil pump but similar to the embodiments described above, can be another type of pump that is decoupled from the engine rotation speed. The embodiment shown in FIG. 12 can achieve the same effect of control-function-1 or control-function-2 in the two oil pump embodiments described above. While the electric oil pump 44 provides constant total mass oil flow rate, the 3-way control valve 42 distributes required oil flow rates into the FOHE 22 and AOHE 24 as required by the control laws.

One embodiment for the control system for the TMS 40 of FIG. 12 is illustrated schematically in combined FIGS. 13A and 13B. Similar to the logic described in combined FIGS. 7A and 7B, the engine rating, e.g. idle, take-off, cruise, approach etc. is fed into the engine rating logic block which then decides which of the ratings should be optimized for either control-function-1 or control-function-2 in the thermal system control laws.

In the embodiment that uses a single oil pump and a 3-way control valve, all flight points except cruise may be optimized to provide minimum oil temperature (control-function-2), while cruise may be optimized for minimize SFC (control-function 1). An error between demanded and actual FOHE oil flow rate may be calculated. The oil pressure sensors measure change in pressure, differential pressure or "dP", across the valve. Assuming a straight-line relationship, the oil mass flow rate can be calculated with constant C20. Alternatively (not shown on the diagram) the actual oil mass flow rate can be sensed directly using a flow rate measuring device. The PID controller then provides the required electric current demand signal while minimizing the error between the measured and target oil mass flow rates. An actuator then converts the electric current into torque which then actuates the valve and causes resultant change in oil flow rate. The mechanical coupling ensures that the total flows at both outlets into the FOHE and AOHE are always equal to the amount of flow at the inlet.

If the fuel temperature is above its limit, similar conversions take place. However, in this case, the PID controller provides current to the actuator while minimizing the error between measured and target fuel temperature.

If the engine is operating at cruise (e.g. control-function-2), the engine rating logic block will control the PID controller to provide electric current to an actuator while minimizing the error between measured and maximum allowable target fuel temperature. This will ensure the best engine SFC for the cruise condition.

Although the preferred embodiments described herein use electrical oil pumps, any type of oil pump that can be decoupled form the rotational speed of the engine may be used. In some embodiments, a variable geometry oil pump may be used. The variable geometry oil pump can be driven by the engine shaft as per current state-of-the-art systems, without installing electric motors. In such an arrangement, the oil flow at a given shaft speed can be modulated utilizing variable geometry, which could be variable inlet/outlet vanes or/and a variable orifice plate. The characteristics of the TMS are unchanged with this arrangement. Alternatively, the variable geometry pump can be driven by a constant speed electric motor, which would simplify the motor control.

In other variants of the TMS described herein, the full oil flow from both pumps may be utilized for any portion of time enabling a much higher oil flow at chosen operating points.

Support for starting the engine may also be added to the control logic. When starting, the engine, air seals may have insufficient pressure resulting in oil leaks. The TMS control logic can provide additional oil pressure before and during engine start, minimizing leakage.

Support for cold operating conditions may also be provided in the control logic. Under cold operating conditions, it is not recommended to start the engine without significant oil flow which also provides pre-heating of the oil to an acceptable working temperature, or when oil temperature is below its acceptable working temperature the engine should idle for a period defined in its operating procedures before accelerating to maximum power. This is to ensure that component thermal stress is reduced and that oil temperature reaches an appropriate working temperature to provide acceptable lubrication. This condition can occur on the ground in cold weather or at high altitude when windmilling. Under severe cold weather, high oil viscosity may prevent a quick rise in oil temperature. The TMS can be operated before start up, to allow the oil to be pre-heated, and the flows can be controlled to allow rapid oil heating when the engine is running, allowing quicker engine start-up and reduced time to take-off. The waste heat of the TMS pump heats up the oil in addition to pressure being applied by the pump.

In some embodiments, the TMS can draw electrical power from the generator that is driven by an APU, ground power, or aircraft batteries prior to engine start. This can pre-heat the oil.

In some embodiments, additional logic may also be provided for engine shut down. After the engine is shut down, oil can continue to be circulated to provide cooling for critical components during soak back.

What is claimed is:

1. A method of controlling the oil flow in a gas turbine engine comprising:
    flowing oil to a first oil pump upstream or downstream of a fuel oil heat exchanger;
    flowing oil to a second oil pump upstream or downstream of an air oil heat exchanger; and
    selecting between two control functions to control an oil mass flow rate through the first oil pump wherein a first control function minimizes specific fuel consumption ("SFC") by the engine and a second control function minimizes average oil temperature; wherein the second control function maintains the fuel temperature below its maximum allowable limit and seeks a minimum average oil temperature without exceeding an acceptable penalty to SFC.

2. The method of claim 1 further comprising the step of controlling the mass flow rate through the second oil pump to keep a combined total mass flow rate of both the first oil pump and the second oil pump constant.

3. The method of claim 1, wherein the first oil pump and second oil pump are mechanically decoupled from the rotation of the engine.

4. The method of claim 1, wherein the first oil pump is an electrical oil pump.

5. The method of claim 4, wherein the second oil pump is an electrical oil pump.

6. The method of claim 1, wherein the first control function is used if the second control function determines the fuel temperature will exceed its maximum allowable limit.

7. The method of claim 1, wherein the second control function is used for all aircraft operating modes except cruise.

8. The method of claim 7 further comprising maintaining a constant oil mass flow rate with the first oil pump.

9. The method of claim 1, wherein the first and second oil pumps are variable geometry oil pumps.

10. The method of claim 1, wherein the second control function determines a starting point for the oil mass flow rate to the first pump at particular flight points using a lookup table.

11. The method of claim 1, wherein the first and second oil pumps are variable geometry oil pumps.

12. The method of claim 1, wherein the second control function determines a starting point for the oil mass flow rate to the first pump at particular flight points using a lookup table.

13. A method of controlling the oil flow in a gas turbine engine comprising:

flowing oil to a first oil pump upstream or downstream of a fuel oil heat exchanger;

flowing oil to a second oil pump upstream or downstream of an air oil heat exchanger;

selecting between two control functions to control an oil mass flow rate through the first oil pump wherein a first control function minimizes specific fuel consumption ("SFC") by the engine and a second control function minimizes average oil temperature; and controlling the mass flow rate through the second oil pump to keep a combined total mass flow rate of both the first oil pump and the second oil pump constant.

14. The method of claim 13, wherein the first oil pump and second oil pump are mechanically decoupled from the rotation of the engine.

15. The method of claim 13, wherein the second control function seeks a minimum average oil temperature without exceeding an acceptable penalty to SFC.

16. The method of claim 13, wherein the first oil pump and second oil pump are electrical oil pumps.

17. The method of claim 13, wherein the first control function is used if the second control function determines the fuel temperature will exceed its maximum allowable limit.

18. A method of controlling the oil flow in a gas turbine engine comprising:

flowing oil to a first 3-way control valve in oil flow communication with a first oil pump, a fuel oil heat exchanger and an air oil heat exchanger; and selecting between two control functions to control the oil mass flow rate between the fuel oil heat exchanger and air oil heat exchanger with the 3-way control valve wherein a first control function minimizes specific fuel consumption by the engine and a second control function minimizes average oil temperature.

* * * * *